United States Patent
Czajkowski et al.

(10) Patent No.: US 7,162,711 B2
(45) Date of Patent: Jan. 9, 2007

(54) METHOD OF AUTOMATICALLY VIRTUALIZING CORE NATIVE LIBRARIES OF A VIRTUAL MACHINE

(75) Inventors: Grzegorz J. Czajkowski, Mountain View, CA (US); Laurent P. Daynes, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 608 days.

(21) Appl. No.: 10/318,500

(22) Filed: Dec. 12, 2002

(65) Prior Publication Data

US 2004/0117789 A1    Jun. 17, 2004

(51) Int. Cl.
*G06F 9/44* (2006.01)
*G06F 9/45* (2006.01)

(52) U.S. Cl. .................. 717/114; 717/106; 717/163
(58) Field of Classification Search ........ 717/114–118, 717/140, 148, 162–165, 106
See application file for complete search history.

(56) References Cited

U.S. PATENT DOCUMENTS

| | | | |
|---|---|---|---|
| 6,415,434 B1* | 7/2002 | Kind | 717/107 |
| 6,427,153 B1* | 7/2002 | Nelson et al. | 707/103 R |
| 6,457,142 B1* | 9/2002 | Klemm et al. | 714/38 |
| 6,546,546 B1* | 4/2003 | Van Doorn | 717/114 |
| 6,547,150 B1* | 4/2003 | Deo et al. | 235/492 |
| 6,658,646 B1* | 12/2003 | Hernandez, III | 717/115 |
| 6,675,371 B1* | 1/2004 | York et al. | 717/114 |
| 6,694,506 B1* | 2/2004 | LeBlanc et al. | 717/108 |
| 6,708,177 B1* | 3/2004 | Schwarcz | 707/100 |
| 6,779,077 B1* | 8/2004 | Bakke et al. | 711/111 |
| 6,799,173 B1* | 9/2004 | Czajkowski et al. | 707/2 |
| 6,834,391 B1* | 12/2004 | Czajkowski et al. | 719/328 |
| 6,851,105 B1* | 2/2005 | Coad et al. | 717/106 |
| 6,876,996 B1* | 4/2005 | Czajkowski et al. | 707/2 |
| 6,901,586 B1* | 5/2005 | Czajkowski | 717/151 |
| 6,931,623 B1* | 8/2005 | Vermeire et al. | 717/108 |
| 6,938,247 B1* | 8/2005 | Czajkowski | 717/151 |
| 7,013,456 B1* | 3/2006 | Van Dyke et al. | 717/130 |
| 7,032,216 B1* | 4/2006 | Nizhegorodov | 717/152 |
| 7,096,455 B1* | 8/2006 | Santiago | 717/114 |

OTHER PUBLICATIONS

Menger et al, "Collection types and implementation in object orienetd software libraries", IEEE Tech. of object oriented language tools 26th Proc., pp. 97-109, 1998.*
Newsome et al, "Proxy compilation of dynamically loaded java classes with Mojo", ACM LCTES, pp. 204-212, 2002.*
Whaley, "Joeq:A virtual machine and compiler infrastructure", ACM IVME, pp. 58-66, 2003.*
Czajkowski et al, "Multitaksing with comprosie: a virtual machine evolution", ACM OOPSLA, pp. 125-138, 2001.*

* cited by examiner

*Primary Examiner*—Anil Khatri
(74) *Attorney, Agent, or Firm*—Martine Penilla & Gencarella, LLP

(57) ABSTRACT

A method of automatically virtualizing core native libraries of a virtual machine is disclosed. In an embodiment, the virtual machine is a java virtual machine (JVM). In this technique, the interface between the virtual machine and the core native libraries is controlled, since multiple instances of a core native library are loaded into the same process based on the number of co-located applications. Moreover, the interactions between the core native libraries and the underlying operating system (OS) are controlled so that a single point of contact is presented to the OS. Also, the dependencies the core native libraries may have on the virtual machine are handled.

21 Claims, 4 Drawing Sheets

| LIBRARIES | READ-ONLY | READ WRITE |
|---|---|---|
| JDK (e.g., libmawt) | 1208 | 104 |
| X Window (e.g., XII) | 2624 | 952 |
| libawt_context.so | 24 | 8 |
| libawt_proxy.so | 544 | 32 |

FIG. 4

METHOD OF AUTOMATICALLY VIRTUALIZING CORE NATIVE LIBRARIES OF A VIRTUAL MACHINE

BACKGROUND OF THE INVENTION

1. Field of the Invention

Embodiments of the present invention generally relate to virtual machines. More particularly, embodiments of the present invention relate to the field of virtualizing core native libraries of a virtual machine.

2. Related Art

Executing multiple applications in a single operating system process (or process) can lead to improved scalability. However, such co-located applications can interfere with one another as they share global states of dynamically loaded libraries. For instance, if two applications A and B depend on and use a dynamic library libcount.so containing the following code:

static int count=0;
    void increase_count( ){count++; }
    int get_count( ){return count; } then when both applications A and B execute in the same process they may see incorrect value returned by get_count( ). This is so because applications A and B each expect to be the sole user of libcount.so, as they would if each executed in its own separate process.

One way around this is to re-code libcount.so so that the variable count is virtualized—each application gets its own copy of it. Accessing the correct copy of the variable count is determined by the accessing application's identifier as follows:

static int count=[MAX_APPS];
    extern int current_app_id( );
    void increase_count( ){count[current_app_id( )]++; }
    int get_count( ){return count[current_app_id( )]; }

There are several problems with this approach. First, the manual work such re-coding requires is proportional to the number of global variables and the number of places they are used in (although this can be somewhat mitigated by using macro definitions). Second, the source code of the dynamic library in question is always required. Third, each access to a global variable requires getting the current application's identifier.

These disadvantages can be quite problematic. Sources of libraries are not always available, and even if they are, they can be quite large, requiring lots of work to make them multi-application safe. The third disadvantage may not be so important, since getting an application identifier can boil down to several machine instructions.

Additionally, core native libraries of a virtual machine such as the conventional Java virtual machine (JVM) have been written with an implicit assumption that only one application will be using them at any given time within an instance of a virtual machine. The conventional JVM does not support interference-free interactions between core native libraries and applications co-located in the same process.

SUMMARY OF THE INVENTION

A method of reducing interference among applications co-located in a process when using dynamic libraries is disclosed. For each dynamic library, multiple instances of the dynamic library are loaded in the same operating system process (or process), whereas each instance of the dynamic library corresponds to one of the multiple applications co-located in the same process. In particular, the text segments (or read-only segments) of the instances of the dynamic library are mapped to the same physical memory pages, leading to a low memory footprint. Moreover, within the process, a co-located application's access to a dynamic library is directed to the instance (of the dynamic library) associated with the accessing application, reducing interference among applications co-located in the same process.

Additionally, a method of automatically virtualizing core native libraries of a virtual machine is disclosed. In an embodiment, the virtual machine is a java virtual machine (JVM). In this technique, the interface between the virtual machine and the core native libraries is controlled, since multiple instances of a core native library are loaded into the same process based on the number of co-located applications. Moreover, the interactions between the core native libraries and the underlying operating system (OS) are controlled so that a single point of contact is presented to the OS. Also, the dependencies the core native libraries may have on the virtual machine are handled.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 4 illustrates size of components of a native library in a virtual machine with virtualized core native libraries in accordance with an embodiment of the present invention.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention.

Exemplary Computer System Environment

Aspects of the present invention can be implemented or executed on a computer system or any other computational system. Although a variety of different computer systems can be used with the present invention, an exemplary computer system 100 is shown in FIG. 1.

Figure 1:
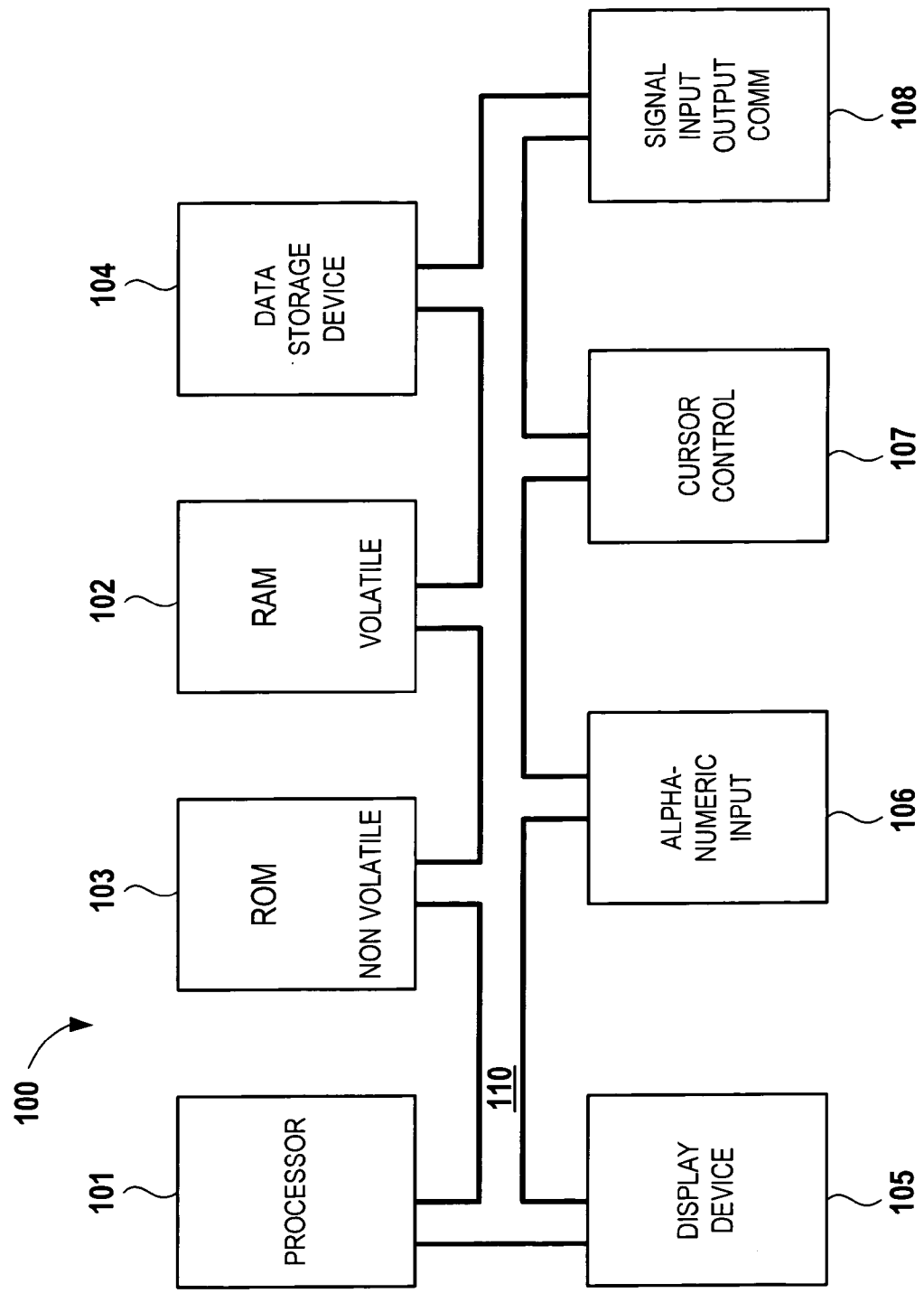
FIG. 1 illustrates an exemplary computer system on which embodiments of the present invention may be practiced.

With reference to FIG. 1, portions of the present invention are comprised of computer-readable and computer executable instructions which reside, for example, in computer-usable media of an electronic system such as the exemplary computer system 100. FIG. 1 illustrates an exemplary computer system 100 on which embodiments of the present invention may be practiced. It is appreciated that the computer system 100 of FIG. 1 is exemplary only and that the present invention can operate within a number of different computer systems including general-purpose computer systems and embedded computer systems.

Computer system 100 includes an address/data bus 110 for communicating information, a central processor 101 coupled with bus 110 for processing information and instructions, a volatile memory 102 (e.g., random access memory RAM) coupled with the bus 110 for storing information and instructions for the central processor 101 and a non-volatile memory 103 (e.g., read only memory ROM) coupled with the bus 110 for storing static information and instructions for the processor 101. Exemplary computer system 100 also includes a data storage device 104 ("disk subsystem") such as a magnetic or optical disk and disk drive coupled with the bus 110 for storing information and instructions. Data storage device 104 can include one or more removable magnetic or optical storage media (e.g., diskettes, tapes) which are computer-readable memories. Memory units of computer system 100 include volatile memory 102, non-volatile memory 103 and data storage device 104.

Exemplary computer system 100 can further include a signal generating device 108 (e.g., a network interface card "NIC") coupled to the bus 110 for interfacing with other computer systems. Also included in exemplary computer system 100 of FIG. 1 is an alphanumeric input device 106 including alphanumeric and function keys coupled to the bus 110 for communicating information and command selections to the central processor 101. Exemplary computer system 100 also includes a cursor control or directing device 107 coupled to the bus 110 for communicating user input information and command selections to the central processor 101. A display device 105 can also be coupled to the bus 110 for displaying information to the computer user. Display device 105 may be a liquid crystal device, other flat panel display, cathode ray tube, or other display device suitable for creating graphic images and alphanumeric characters recognizable to the user. Cursor control device 107 allows the user to dynamically signal the two-dimensional movement of a visible symbol (cursor) on a display screen of display device 105. Many implementations of cursor control device 107 are known in the art including a trackball, mouse, touch pad, joystick or special keys on alphanumeric input device 106 capable of signaling movement of a given direction or manner of displacement. Alternatively, it will be appreciated that a cursor can be directed and/or activated via input from alphanumeric input device 106 using special keys and key sequence commands.

In an embodiment, the present invention is configured as computer-executable instructions stored in a computer-readable medium, such as a magnetic disk, CD-ROM, an optical medium, a floppy disk, a flexible disk, a hard disk, a magnetic tape, a RAM, a ROM, a PROM, an EPROM, a flash-EPROM, or any other medium from which a computer can read.

Loading Multiple Instances of Dynamic Libraries in the Same Process to Reduce Interference Among Co-Located Applications A method of reducing interference among applications co-located in a process when using dynamic libraries is disclosed. For each dynamic library, multiple instances of the dynamic library are loaded in the same operating system process (or process), whereas each instance of the dynamic library corresponds to one of the multiple applications co-located in the same process. In particular, the text segments (or read-only segments) of the instances of the dynamic library are mapped to the same physical memory pages, leading to a low memory footprint. Moreover, within the process, a co-located application's access to a dynamic library is directed to the instance (of the dynamic library) associated with the accessing application, reducing interference among applications co-located in the same process.

This technique is scalable and transparent compared to conventional approaches. In an embodiment, the present invention is practiced with an operating system such as a Solaris Operating Environment platform.

The Solaris Operating Environment supports a runtime linker auditing interface. Audit libraries can monitor and modify certain operations, such as mapping of shared binary objects into memory and the binding of symbols in a customized way. Use of the term "shared binary object" refers to a concatenation of relocatable objects (.o files) that provide services that might be bound to a dynamic executable at runtime. A shared binary object may have dependencies on other shared object. In the linker/loader literature, the typically used term is shared object, which may be confusing when used along with the concepts from object-oriented programming.

In order to isolate audit libraries from the symbol binding requirements of the audited applications and shared binary objects, the interface employs its own link-map list, with each entry on the list describing a single shared binary object within the process. The symbol search mechanism required to bind shared binary objects for an application traverses this list of link-maps. Thus, the link-map list provides the name-space for process symbol resolution.

The runtime linker itself is also described by a link-map, which is maintained on a different list from that of the application objects. The residing of the linker in its own unique name space prevents any direct binding of the application to services within the linker. The audit interface allows for the creation of an additional link-map list, such that audit libraries are also isolated from the symbol binding requirements of the application.

By taking advantage of the infrastructure for creating audit libraries and new link-map lists, it is possible to load multiple copies (or instances) of the same library into a single OS process in which multiple applications are co-located. Each such instance of the library is loaded by the dlmopen( ) function on a separate link-map list and a virtual address different from any other instance in the same process, whereas LM_ID_NEWLM is specified as the first parameter for the dlmopen( ) function to ensure creating a new link-map, effectively creating a new name space within the process. However, text segments (or read-only segments) of the instances of the library, regardless of what process's virtual memory they are mapped into, are mapped into the same physical memory pages.

Figure 2:
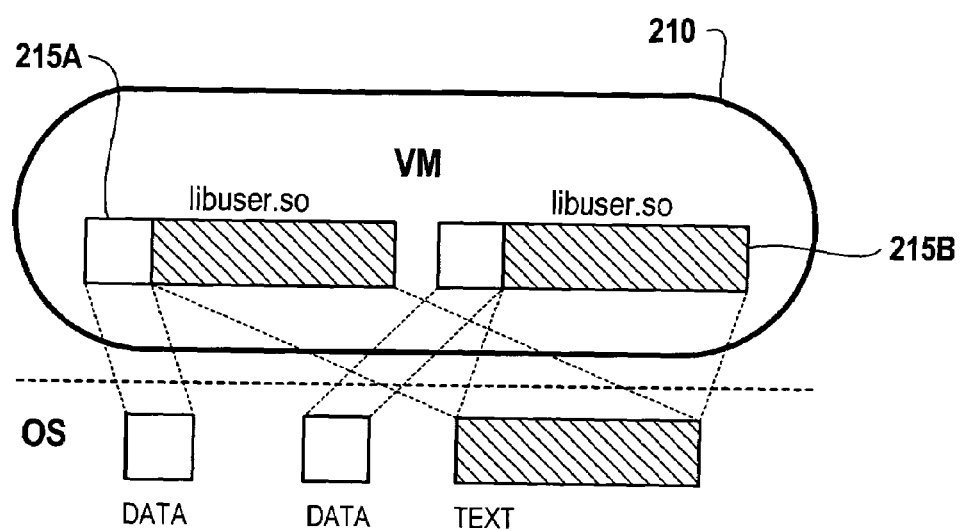
FIG. 2 illustrates multiple instances of a dynamic library loaded in the same process in accordance with an embodiment of the present invention.

FIG. 2 illustrates multiple instances of a dynamic library loaded in the same process in accordance with an embodiment of the present invention. In particular, in a virtual machine 210, multiple instances 215A and 215B of the dynamic library libuser.so are loaded at distinct virtual addresses. Each instance 215A and 215B has a data segment (or read-write segment) and a text segment (or read-only segment). However, their text segments are mapped onto the same physical memory pages, providing a low memory footprint despite the multiple instances of the dynamic libraries.

The code for directing the co-located application's access to the instance (of the dynamic library) associated with the accessing application can be incorporated in the accessing application or can be put in another library, obviating the need for re-compilation of the application. This has the advantage of not having to modify the original dynamic library. The accessing application's identifier can be used to direct the access to the instance (of the dynamic library) associated with the accessing application, reducing interference.

Virtualize Core Native Libraries of a Virtual Machine

A method of automatically virtualizing core native libraries of a virtual machine is disclosed. In an embodiment, the virtual machine is a java virtual machine (JVM). In this technique, the interface between the virtual machine and the core native libraries is controlled, since multiple instances of a core native library are loaded into the same process based on the number of co-located applications. Moreover, the interactions between the core native libraries and the underlying operating system (OS) are controlled so that a single point of contact is presented to the OS. Also, the dependencies the core native libraries may have on the virtual machine are handled.

Core native libraries contain the implementations of native methods from core packages, distributed with the JDK (Java Developers Kit). These core native libraries were typically coded without much thought of co-located applications in the same process, and contain a substantial amount of static (global) state.

The solution adopted to virtualize the core native libraries of the virtual machine to support applications co-located in the same process has none of the performance overhead or engineering cost disadvantages associated with prior attempts to enable a virtual machine to support applications co-located in the same process. It is based on a novel technique described above, which allows for loading multiple instances of the same dynamic library into a single process. In particular, one advantages is a low memory footprint. This technique is applied to the core native library Abstract Window Toolkit (AWT) subsystem to provide per-isolate (whereas an isolate is an application executing in the virtual machine) static native state. The applicability to AWT is particularly interesting, as these JDK components generate large amounts of meta-data (loaded classes, compiled method, etc.). Since meta-data is shared, the ability to execute GUI-enabled isolates increases the scope of memory footprint savings.

Figure 3:
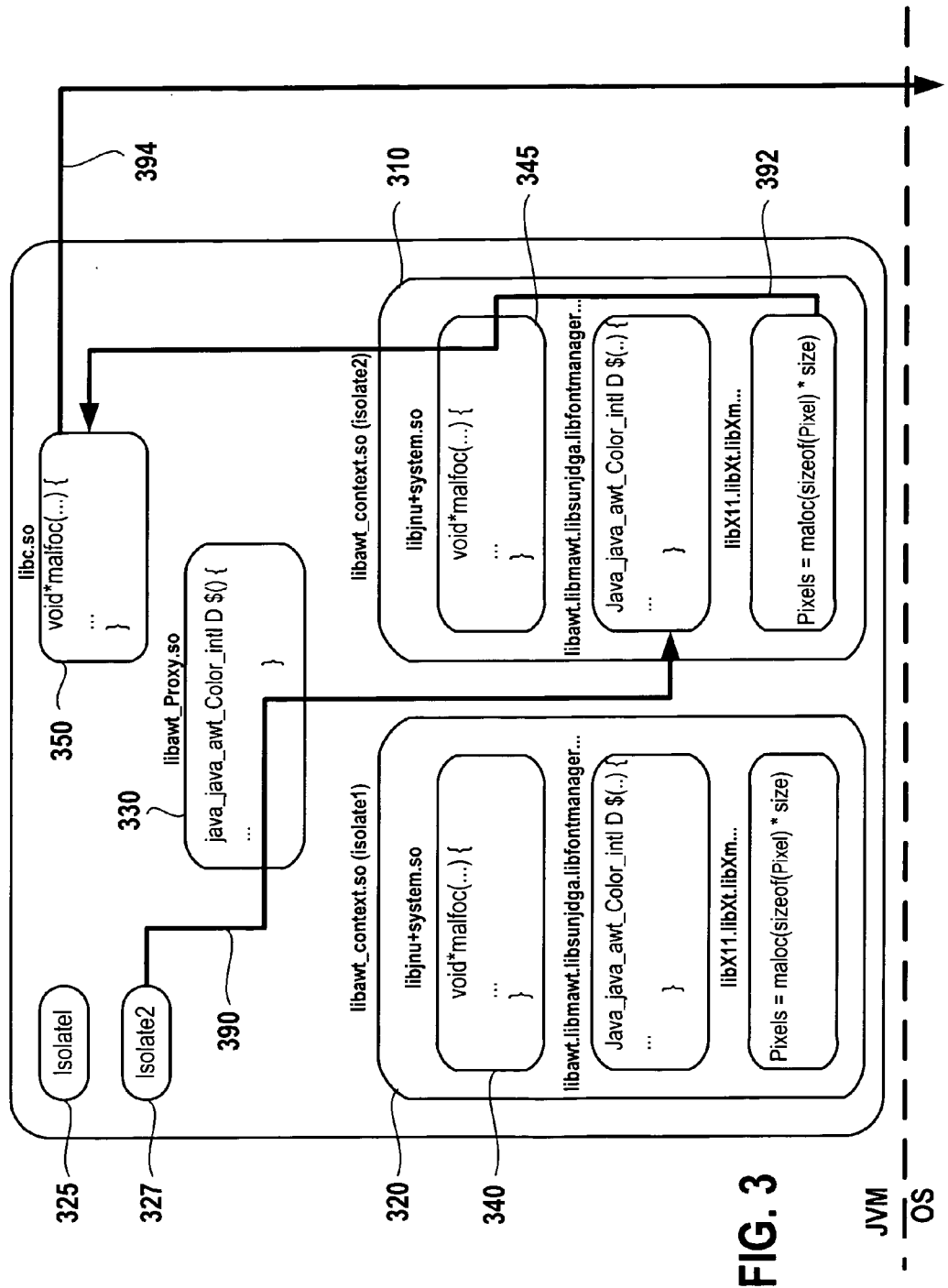
FIG. 3 illustrates virtualization of a core native library of a virtual machine in accordance with an embodiment of the present invention.

FIG. 3 illustrates virtualization of a core native library of a virtual machine in accordance with an embodiment of the present invention. In an embodiment, the virtual machine is a java virtual machine (JVM) operating on the Solaris Operating Environment platform. Here, the Abstract Window Toolkit (AWT)-related core native libraries are virtualized. Arguably out of the JDK components with core native libraries AWT is the most complex. For instance, it starts its own threads to handle events, and depends on X11 and other related libraries (e.g., Motif), which are in themselves fairly complex. The major issues were (i) to manage the interface between the virtual machine and multiple instances of AWT-related native libraries, (ii) to handle the dependencies of AWT-related libraries on the virtual machine itself, and (iii) to prevent conflicting use of OS resources by these instances.

Since in the JVM as illustrated in FIG. 3 there exist multiple AWT contexts 310 and 320 (i.e., sets of AWT-related JDK and system libraries sharing the same unique link-map list) downcalls (when a Java application calls a native method) must be properly dispatched to the native method in the context associated with the calling isolate (or Java application) 325 and 327.

The JVM interfaces with native code via JNI(Java Native Interface), and thus the names of core native methods conform to the same stylized naming scheme as an ordinary native library. A simple script based on the standard nm utility (listing the symbol tables of shared binary objects) and on javap (disassembling Java classes) is sufficient to generate a list of all such methods, along with their signatures. The list is then used to generate libawt_proxy.so 330. At boot time, the JVM loads a single instance of this library in the main context (i.e., JVM's context). Each function defined there forwards its invocation to a per-isolate instance of an automatically generated libawt_context.so 310 and 320. A new instance of this library is loaded by libawt_proxy.so 330, using dlmopen( ), whenever a new isolate 325 and 327 is started. The library is a part of the AWT context, and contains all of the AWT-related JDK and X11 libraries in its list of shared binary object dependencies. Thus loading an instance libawt_context.so 310 and 320 loads a new set of instances of these libraries as well, that is, the entire context.

The forwarding of invocations does not require any changes to the JDK or the runtime system. Whenever a native method is called, the runtime finds the required name in libawt_proxy.so 330 and calls it (See FIG. 3, arrow 390). Only there, the actual lookup of the isolate (or Java application) identifier and the associated AWT context takes place. For example, here is a method from libawt_proxy.so 330:

```
void Java_java_awt_Color_initIDs(JNIEnv *env, jclass cls) {
    int iid= get_isolate_id( );
    context ctx = contexts[iid];
    (*ctx).Java_java_awt_Color_initIDs(env, cls);
}
```

The JVM groups certain often used sequences of JNI upcalls (when a native method requests a service from the JVM) into JNI utility (JNU) functions available to core native methods. A function which invokes a static Java method from within native code by its name, class name, and signature is a good example—such a sequence involves looking up the class, looking up the method, and then invoking it, taking care of possible errors at each step. These utility functions are defined in the shared libraries comprising the JVM. AWT-related libraries, which use these utility functions, thus depend on the shared libraries comprising the virtual machine (e.g., libc.so 350). Such a dependency is undesirable, as loading an instance of libawt_context.so 310 and 320 would also cause the loading of a new instance of the JVM's libraries along with the new AWT context. In the best case, this would only waste memory; in the worst, it can lead to a process crash if a conflict occurs among multiple JVM contexts. For example, each of them may zero out the heap during initialization.

In order to prevent such dependencies, the libjnu+system.so 340 and 345 shared library is generated. It defines all the JNU functions on which AWT-related libraries depend and is linked into libawt_context.so 310 and 320. Each of these JNU functions forwards its invocation back to the unique instance of libc.so 350 in JVM. For example:

```
void
JNU_ThrowNullPointerException(JNIEnv *env, char *msg) {
    (*vm_context). JNU_ThrowNullPointerException(env, msg);
}
``` where the vm_context vector of addresses of JNU functions is passed down from libawt_proxy.so 330 to an initialization routine in libjnu+system.so 340 and 345 when a new instance of libawt_context.so 310 and 320 is loaded.

Loading multiple AWT contexts can cause inter-isolate (or inter-application) interference because the contexts share the system calls interface. While calls to lets say getpid( ) from different contexts are not dangerous, the same cannot be said about for example sbrk( ). Each context's sbrk( ) would initialize the amount and initial address of space allocated for the process's data segment to the same value. Subsequent memory allocations through for example malloc( ) invoked from different contexts would return the same address, leading to memory corruption. It is thus vital to neutralize a potential of conflicting use of system calls.

This issue is solved by extending the technique described above, where a vector of JNU functions is passed down to an AWT context so that their invocations are properly forwarded back to the virtual machine's context. To this end, vm_context is extended with addresses of (i) system functions(e.g., sbrk( )), (ii) derivative library functions (e.g., malloc( )), and (iii) other library functions the use of which must be confined to the virtual machine's context (e.g., dlmopen( )). By itself this does not guarantee that the OS interface is used in an interference-free way but at least introduces a point of programmable control over potentially dangerous behavior. For example, malloc( ) and free( ) behave as expected in this scheme, while the usage of signal( ) system call may have to be modified, for example by injecting transparent chaining of signal handlers and ensuring the chaining will be respecting by all contexts. In JVM, this has not been necessary for the AWT subsystem. FIG. 3 shows the forwarding of AWT native method invocations to the appropriate AWT context via arrow 390, forwarding system and library calls from an AWT context back to the virtual machine's context via arrow 392, and interfacing between the virtual machine's context and the OS via arrow 394.

FIG. 4 illustrates size of components of a native library in a virtual machine with virtualized core native libraries in accordance with an embodiment of the present invention.

There are several components of memory footprint of an application executing in JVM: (i) Java objects created on the heap, (ii) space occupied by the user-supplied native libraries, (iii) meta-data, such as bytecodes, constant pools, and compiled methods, and (iv) space occupied by core native libraries. The first two are easily controlled, as at all points of the programs' execution the amount of memory used by them is known.

The amount of memory required by core native libraries related to AWT in JVM is summarized in FIG. 4. The size of libawt_proxy.so 330 is 576 KB, most of which is read-only. This library is not a part of the AWT context and is loaded once by JVM. The underlined boldface in FIG. 4 indicates additional memory required for a new AWT context.

The total size of the AWT context, loaded for each isolate (or Java application) that uses AWT, is 4920 KB, of which 1312 KB is attributed to the JDK's native libraries, 32 KB to libawt_context.so (it includes libjnu+system.so), and the rest to X11, Xm, Xt, etc. The read-only portion of the AWT context is 3856 KB. Thus, a new isolate that needs to use AWT will increase the footprint by 1064 KB due to the new AWT context's write-able memory. With the exception of the 8 KB from libawt_context.so, all this memory would be required when running applications in separate virtual machines. This is so because the technique presented here causes the text segments (or read-only segments) of libraries comprising the AWT context in JVM to be backed by the same physical memory pages.

This technique is applicable for non-core native libraries, given they are sufficiently robust, and for virtual machines different from the JVM.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of virtualizing a plurality of core native libraries of a virtual machine, said method comprising:
   generating a proxy library for controlling an interface between said virtual machine and said plurality of core native libraries and loading multiple instances of a subset of said plurality of core native libraries for each application co-located in a process, and for forwarding function downcalls to a subgroup of said multiple instances; and
   generating a forwarding library for each of said multiple instances to forward appropriate operating system calls and appropriate function upcalls from said multiple instances to said virtual machine.

2. The method as recited in claim 1 wherein said virtual machine is a java virtual machine.

3. The method as recited in claim 1 wherein said forwarding function downcalls is based on an application identifier.

4. The method as recited in claim 1 wherein said process is in a Solaris Operating Environment platform.

5. The method as recited in claim 4 wherein generating a proxy library further includes loading said multiple instances using a dlmopen( ) function.

6. The method as recited in claim 1 wherein said proxy library is loaded in the context of the virtual machine.

7. The method as recited in claim 1 wherein said forwarding library associated with each of said multiple instances differs from the forwarding library associated with the remaining instances of said multiple instances.

8. A computer-readable medium comprising computer-executable instructions stored therein for virtualizing a plurality of core native libraries of a virtual machine, said medium comprising:

code to generate a proxy library to control an interface between said virtual machine and said plurality of core native libraries, a first sub-routine to load multiple instances of a subset of said plurality of core native libraries for each application co-located in a process, and a second sub-routine to forward function downcalls to a subgroup of said multiple instances; and code to create a forwarding library for each of said multiple instances to forward appropriate operating system calls and appropriate function upcalls from said multiple instances to said virtual machine.

9. The computer-readable medium as recited in claim 8 wherein said virtual machine is a java virtual machine.

10. The computer-readable medium as recited in claim 8 wherein said second sub-routine performs downcalls based on an application identifier.

11. The computer-readable medium as recited in claim 8 wherein said process is in a Solaris Operating Environment platform.

12. The computer-readable medium as recited in claim 11 wherein said first sub-routine further includes a routine to load said multiple instances using a dlmopen( ) function.

13. The computer-readable medium as recited in claim 8 wherein said proxy library is loaded in the context of the virtual machine.

14. The computer-readable medium as recited in claim 8 wherein said code to create further includes a routine to associate with each of said multiple instances differs from the forwarding library associated with the remaining instances of said multiple instances.

15. A computer system comprising:

a processor;

a memory device storing computer readable instructions including code to generate a proxy library to control an interface between a virtual machine and a plurality of core native libraries, a first sub-routine to load multiple instances of a subset of said plurality of core native libraries for each anplication co-located in a process, and a second sub-routine to forward function downealls to a subgroup of said multiple instances; and code to create a forwarding library for each of said multiple instances to forward appropriate operating system calls and appropriate function upcalls from said multiple instances to said virtual machine.

16. The computer system as recited in claim 15 wherein said virtual machine is a java virtual machine.

17. The computer system as recited in claim 15 wherein said second sub-routine downcalls based on an application identifier.

18. The computer system as recited in claim 15 wherein said process is in a Solaris Operating Environment platform.

19. The computer system as recited in claim 18 wherein said first sub-routine further includes a routine to load said multiple instances using a dlmopen( ) function.

20. The computer system as recited in claim 15 wherein said proxy library is loaded in the context of the virtual machine.

21. The computer system as recited in claim 15 wherein said code to create further includes a routine to associate with each of said multiple instances differs from the forwarding library associated with the remaining instances of said multiple instances.

* * * * *